United States Patent [19]

Faber

[11] 4,090,801
[45] May 23, 1978

[54] CUTTING INSERT AND ROTARY MILLING CUTTER

[75] Inventor: Kurt Heinrich Albert Erich Faber, Sandviken, Sweden

[73] Assignee: Sandvik Aktiebolag, Sweden

[21] Appl. No.: 763,362

[22] Filed: Jan. 28, 1977

Related U.S. Application Data

[63] Continuation of Ser. No. 648,017, Jan. 12, 1976, abandoned.

[30] Foreign Application Priority Data

Jan. 23, 1975 Sweden .................... 7500697

[51] Int. Cl.² .................... B26D 1/00
[52] U.S. Cl. .................... 407/113; 407/50
[58] Field of Search .................... 29/95 R, 96, 105 R, 29/105 A

[56] References Cited

U.S. PATENT DOCUMENTS

| | | | |
|---|---|---|---|
| 1,935,069 | 11/1933 | Walker et al. | 29/105 A |
| 2,805,467 | 9/1957 | Greenleaf | 29/105 A |
| 3,138,847 | 6/1964 | Berry, Jr. | 29/105 R |
| 3,616,507 | 11/1971 | Wirfelt | 29/105 A |
| 3,786,545 | 1/1974 | Wirfelt | 29/105 R |
| 3,902,232 | 9/1975 | Hertel | 29/95 R |

FOREIGN PATENT DOCUMENTS 1,171,671  11/1969  United Kingdom .......... 29/105 A

Primary Examiner—Leonidas Vlachos
Attorney, Agent, or Firm—Burns, Doane, Swecker & Mathis

[57] ABSTRACT

The invention concerns a cutting insert, having the shape of an isosceles triangle, which comprises a polygonal flat plate the top and bottom surfaces of which intersect with two edge surfaces of equal length to define main cutting edges, and at least one other edge surface adjoining said two edge surfaces at two cutting corners while intersecting with the top and bottom surface at right angles. The plate has the shape of an isosceles triangle the base of which is formed by said other edge surface. Secondary cutting edges are provided. The invention also involves a rotary milling cutter provided with a plurality of the cutting inserts.

5 Claims, 5 Drawing Figures

U. S. Patent  May 23, 1978  4,090,801
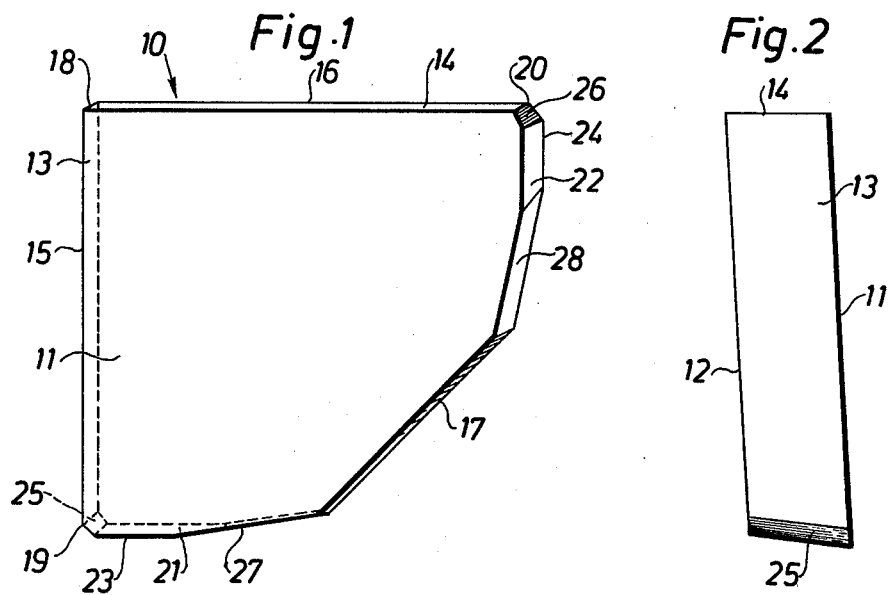
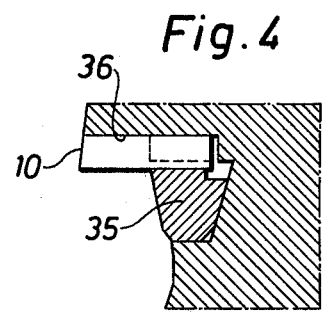
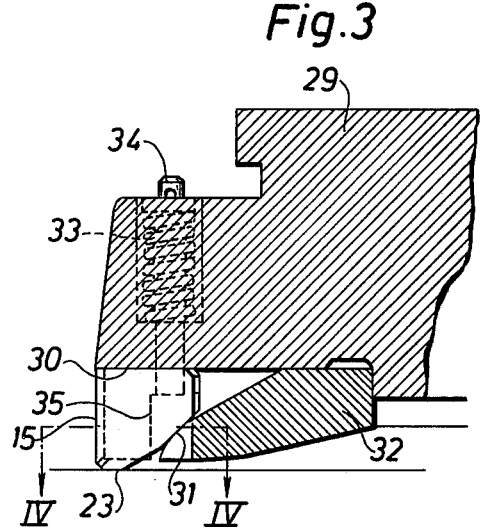
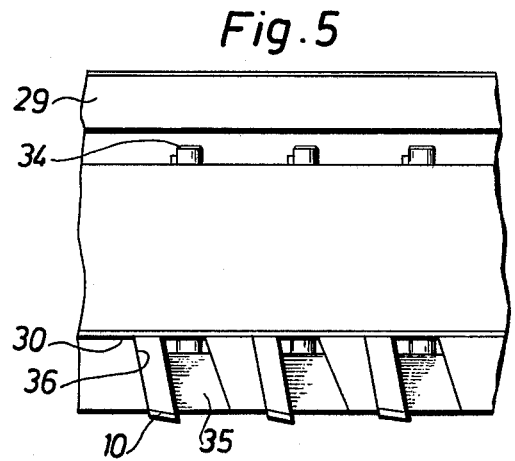

CUTTING INSERT AND ROTARY MILLING CUTTER

This is a continuation, of application Ser. No. 648,017 filed Jan. 12, 1976, now abandoned.

This invention relates to a rotary milling cutter, and to a reversible cutting insert for use in said milling cutter, said insert comprising a polygonal flat plate the top and bottom surfaces of which intersect with two edge surfaces of equal length to define main cutting edges. At least one other edge surface adjoins said two edge surfaces at two cutting corners while intersecting with the top and bottom surfaces at right angles.

Rotary milling cutters equipped with cutting inserts such as referred to above previously have been known and appear for instance in U.S. Pat. No. 3,786,545. Each such insert is in the form of a polygonal flat plate, one edge surface of which rests against a support surface that is plane ground in the cutter body parallel to the plane of rotation of the cutter and each insert is secured thereto by wedge clamping means. There are many advantages attainable with such technical solution, one being a very good surface finish on the workpiece because of the improved axial support thus achieved.

However, it has been discovered that under certain conditions cutting forces arose having such direction that each insert of the aforementioned kind did not have a wholly stable support in such rotary milling cutter. The primary reason therefor is the geometrical configuration of the inserts. At the same time it has not been possible to reach the desired cutting depth at certain operations, shoulder milling for instance.

An object of the present invention is to provide a cutting tool and a cutting insert of new geometrical configuration that represents a solution to above related problems.

To this end there is provided, according to one aspect of the invention, a cutting insert of the aforementioned type which is characterized in that said polygonal insert substantially is in the shape of an isosceles triangle wherein said edge surface, provided additionally to said two edge surfaces equal length, forms the base of said triangle, a plain bevelled surface being provided at each cutting corner, respectively, intersecting with said top and bottom surfaces at an acute angle, said last junction defining a secondary cutting edge which meets with associated main cutting edges at the cutting corners.

The invention will now be described in greater detail in the following description and by way of an illustrative example, taken with reference to the accompanying drawing where:

FIG. 1 is an elevational view of one embodiment of the cutting insert of the invention;

FIG. 2 is another elevational view of the insert shown in FIG. 1;

FIG. 3 is an axial sectional view of a rotary cutter equipped with the cutting insert shown in FIGS. 1-2;

FIG. 4 is a sectional view along the line IV—IV in FIG. 3; and

FIG. 5 is a part of the rotary cutter in side-view.

Referring now to the drawings and more particularly to FIGS. 1-2 thereof, the insert consists of a polygonal flat plate designated generally by numeral 10, comprising top and bottom surfaces 11 and 12 with edge surfaces 13, 14 provided therebetween. The top and bottom surfaces are of triangular shape wherein edge surfaces 13 and 14 are equal length, thus providing an isosceles triangle. These edge surfaces 13, 14 respectively form an acute angle with the top and bottom surfaces along edges 15 and 16, said edges defining main cutting edges. One other edge surface, indicated at 17, forms the base of said isosceles triangle. Alternatively edge surface 17 could be in the shape of two angularly related surfaces.

Top and bottom surfaces 11 and 12 meet with the edge surfaces at three corners 18, 19 and 20, of which only said last corners 19 and 20 represent cutting corners. Edge surfaces 13 and 14 preferably meet at right angles at corner 18. Plain bevelled surfaces 21 and 22 are respectively provided at the intersection between edge surfaces 13, 14 and edge surface 17, one said bevelled surface 21 intersecting at corner 19 with said surface 11 and edge 23 less than 90° and the other bevelled surface 22 likewise intersecting at corner 20 with said bottom surface 12 at an edge 24 less than 90°. The said last junctions define secondary cutting edges adapted to generate the surface of the workpiece, and they meet with associated main cutting edges at the cutting corners. Thus, main cutting edge 14 meets with edge 23 at corner 19 and main cutting edge 16 likewise meets with edge 24 at corner 20. At each cutting corner 19 and 20 there is provided at minor corner chamfer 25 and 26 for strengthening purposes, said last chamfers being oblique in same relation to the top and bottom surfaces as adjacent bevelled surfaces 23 and 24.

Additional bevelled surfaces may be provided at each cutting corner as shown in the illustrated embodiment. These beveled surfaces, indicated at 27 and 28, are like surfaces 21 and 22 intersecting with top and bottom surfaces at an acute angle. Preferably the bevelled surface located next to the cutting corner, thus surface 21 at corner 19, intersects at a smaller angle with the top surface 11 than that of adjacent bevelled surface 27.

Specifically, the insert is of such configuration that secondary cutting edge 23 is parallel with edge surface 14 and thus also main cutting edge 16 whereas edge 24 is parallel with edge surface 13 and main cutting edge 15. These relations are the result of providing said edges 23 and 24 as finish cutting edges and simultaneously having each insert secured to the cutter body as specifically described hereinafter.

With the embodiment shown, edge surfaces 13 and 14 that define the main cutting edges respectively form an acute angle with the top and bottom surfaces along said main cutting edges. This means that the insert has a positive cutting geometry Edge surface 13 thus forms an acute angle with top surface 11, and edge surface 14 forms an acute angel with bottom surface 12. Although the invention is not restricted thereto, the angle of inclination of edge surfaces 13, 14 and bevelled surfaces 21, 22 can be selected so that a clearance angle of approximately 6° is obtained at the main cutting edges 15, 16 and of approximately 12° at the secondary cutting edges 23, 24. It is to be understood however, that the insert could also be provided with a negative cutting geometry, the edge surfaces 13, 14 then intersecting with top and bottom surfaces 11, 12 at right angles. Thus, in this way there are obtained two main cutting edges with associated secondary cutting edges.

Referring now to FIGS. 3-4, a rotary cutting tool is formed so as to be equipped with cutting inserts such as hereinbefore described. In the drawing a cutter body 29 has recesses spaced around the circumference thereof, in which recesses cutting inserts 10 are located. Each recess comprises a bottom support surface and edge support surfaces upstanding therefrom. When positioning each insert in its recess in the cutter body 29, one edge surface 14 is adapted to rest against an edge support surface 30 plane around in the cutter body substantially parallel to the plane of rotation of the cutter. By arranging edge surface 14 parallel with opposed edge 23 said last edge is capable of making finishing cuts on a workpiece. The above related positioning principle results in there being appropriate clearance angles presented along main cutting edge 15 and secondary cutting edge 23.

One locating member is provided to act as radial support for the edge surface 17, said edge support 31 being provided on a support ring 32 secured to the cutter body 29. The recesses for the reception of the inserts are formed as apertures in said support ring. With the embodiment shown said edge surface 17 extends in a direction 45° in relation to edge surfaces 13, 14. It is to be understood, however, that said radial support may alternatively have another formation than that whown in FIG. 3, for instance, formed by two surfaces angularly related to each other, the insert then being of complementary shape at edge portion 17.

The clamping means adapted to safely secure each insert in its site comprises a pull rod 34 arranged to move substantially parallel with the axis of rotation of said cutter body 29. The rod is arranged to be actuated by a spring 33, the end portion of said rod being provided with a clamping wedge 35. In addition to being support against edge supports 30 and 31 said wedge 35 urges one flat surface of the insert against bottom support surface 36. This positioning of the insert is accomplished via the pull rod 34 and the wedge 35, which is in close contact with the opposite flat top or bottom surface of said insert, as is evident from FIGS. 4–5.

I claim:

1. A reversible cutting insert for use in a rotary milling cutter comprising
   a polygonal flat plate, the top and bottom surfaces of which intersect with two edge surfaces of equal length to define main cutting edges,
   at least one other edge surface adjoining said two edge surfaces at two cutting corners,
   characterized in that said plate substantially is in the shape of an isosceles triangle, wherein said two surfaces (13) and (14) defining the main cutting edges are perpendicularly related, whereas said other edge surface (17) extends in a direction generally transverse to the bisector of the angle between said two edge surfaces (13) and (14), and two plain bevelled surfaces (21) and (22) being provided at said cutting corners respectively intersecting with said top and bottom surfaces at an acute angel,
   said last junction defining secondary cutting edges (23) and (24) which meet with associated main cutting edges at the cutting corners (19) and (20) and in parallel with opposed edge surfaces (14) and (13) respectively.

2. A cutting insert according to claim 1, wherein additional plain bevelled surfaces (27) and (28) are provided at the cutting corners likewise intersecting with said top and bottom surfaces at an acute angle.

3. A cutting insert according to claim 1, wherein said two edge surfaces (13) and (14) respectively form an acute angle with the top and bottom surfaces along said main cutting edges (15) and (16).

4. A cutting insert according to claim 1, wherein at each cutting corner there is presented a smaller angle of intersection between bevelled surface (23, 24) and associated flat surface (11, 12) than between bevelled surface (27, 28) and same flat surface (11, 12).

5. A cutting insert according to claim 1, wherein a corner chamfer (25, 26) is provided at each cutting corner, each said chamfer being approximately likewise inclined to said top or bottom surfaces as adjacent bevelled surfaces 21 and 22 respectively.

* * * * *